United States Patent [19]
Leboisne

[11] Patent Number: 6,119,578
[45] Date of Patent: Sep. 19, 2000

[54] SERVOMOTOR USING A CONTROLLED DENSITY FILTER

[75] Inventor: Cedric Leboisne, Paris, France

[73] Assignee: Bosch Systemes de Freinage, Drancy, France

[21] Appl. No.: 09/269,160

[22] PCT Filed: Feb. 22, 1999

[86] PCT No.: PCT/FR99/00391

§ 371 Date: Mar. 16, 1999

§ 102(e) Date: Mar. 16, 1999

[87] PCT Pub. No.: WO99/43526

PCT Pub. Date: Sep. 2, 1999

[30] Foreign Application Priority Data

Feb. 27, 1998 [FR] France ................... 98 02378

[51] Int. Cl.[7] ............... F15B 9/10; F15B 21/04
[52] U.S. Cl. .......................... 91/376 R; 92/78
[58] Field of Search ............... 91/376 R; 92/78

[56] References Cited

U.S. PATENT DOCUMENTS 3,499,288  3/1970  Randol .................. 91/376 R
3,897,716  8/1975  Ramage et al. .......... 91/376 R
3,972,263  8/1976  Welsh .................... 91/376 R

FOREIGN PATENT DOCUMENTS 2706403  12/1994  France .
3510844  10/1986  Germany .

Primary Examiner—F. Daniel Lopez
Attorney, Agent, or Firm—Leo H McCormick, Jr.; Warren Comstock

[57] ABSTRACT

A pneumatic brake booster having a valve (7) actuated by movement of an operating rod (8) within a hub (6) from a position of rest to an extreme actuation position. In the position of rest, the valve (7) is closed to a pressure source (A) and when moved toward the extreme actuation opened to the pressure source (A). A purification filter (9) located between the pressure source (A) and valve (7) is made of a compressible material which has a minimum volume with the valve in the rest position and a maximum volume when the operating rod (8) reaches the extreme actuation position.

10 Claims, 4 Drawing Sheets

SERVOMOTOR USING A CONTROLLED DENSITY FILTER

The present invention relates to a pneumatic brake booster of the type comprising: a rigid casing; a moving partition delimiting, in leaktight fashion, a front chamber and a rear chamber inside the casing, the front chamber in operation being connected to a first pressure source delivering a first pressure; a pneumatic piston moving with the moving partition and ending in a hub mounted to slide in an opening in the casing; a three-way valve housed in the hub and capable selectively of adopting a state of rest and an actuating state, in which states the rear chamber is respectively connected to the first pressure source and to a second pressure source which delivers a second pressure higher than the first pressure; an operating rod mounted to slide in the hub in a first axial direction between first and second extreme positions for which the valve is respectively in its state of rest and in its actuating state, this operating rod being subjected to an elastic force acting in a second axial direction the opposite of the first; and an annular purification filter inserted between the second pressure source and the rear chamber and housed in the hub around the operating rod.

BACKGROUND OF THE INVENTION

Devices of this type are well known in the prior art, and described, for example, in FIG. 1 of Patent document FR-2,706,403.

Research in recent years, illustrated, for example, in Patent documents EP 0,796,188 and FR-2,731,668, has, in particular, made it possible to reduce the operating noise and response time of boosters.

The search for further progress in this field has, however, led to the question of the filtering of the air and of the noise at the inlet of boosters to be re-examined, the objective still being to make the filtering all the more selective, the more crucial the reduction in booster response time.

SUMMARY OF THE INVENTION

The invention falls within this context, and its object is to provide a booster in which the filter adapts automatically to the stress transmitted to this booster.

To this end, the booster of the invention which in other respects conforms to the above preamble, is essentially characterized in that the filter is made of a compressible material, in that a first face of the filter is kept stationary with respect to the hub, in that a second face of the filter is kinematically connected to the operating rod so that it can be displaced with respect to the hub, and in that the filter has a volume that varies with the displacement of the second face of the filter, the filter having a minimum volume for which it is compressed, when the operating rod is in its first extreme position, and a maximum volume, for which it is relaxed, when the operating rod is in its second extreme position.

By virtue of these features, the filter is all the more selective, the greater the amplitude of displacement of the operating rod with respect to the hub, this parameter precisely constituting an appropriate measure of the intensity of the stress transmitted to the booster.

The booster of the invention may comprise an annular support secured to the hub, to which the first face of the filter is attached, the second face of the filter being attached to an outer edge of a flange, an inner edge of which is secured to the operating rod.

In one possible embodiment of the invention, the flange follows on from the annular support in the first axial direction, and the second face of the filter follows on from its first face in the first axial direction.

In another possible embodiment of the invention, at least part of the second face of the filter is kinematically linked with an active region of a tilting member resting both on the hub and on the operating rod, a displacement of a first amplitude of the operating rod with respect to the hub producing a displacement of a second amplitude, greater than the first, of the active region with respect to the hub.

Finally, the filter may be made of a porous polymer, the first and second faces of which are bonded to the annular support, to the flange, or to the tilting member, or rest elastically against these components.

Other features and advantages of the invention will emerge clearly from the description given hereinafter by way of non-limiting indication with reference to the appended drawings.

DETAILED DESCRIPTION OF THE INVENTION

Figure 1:
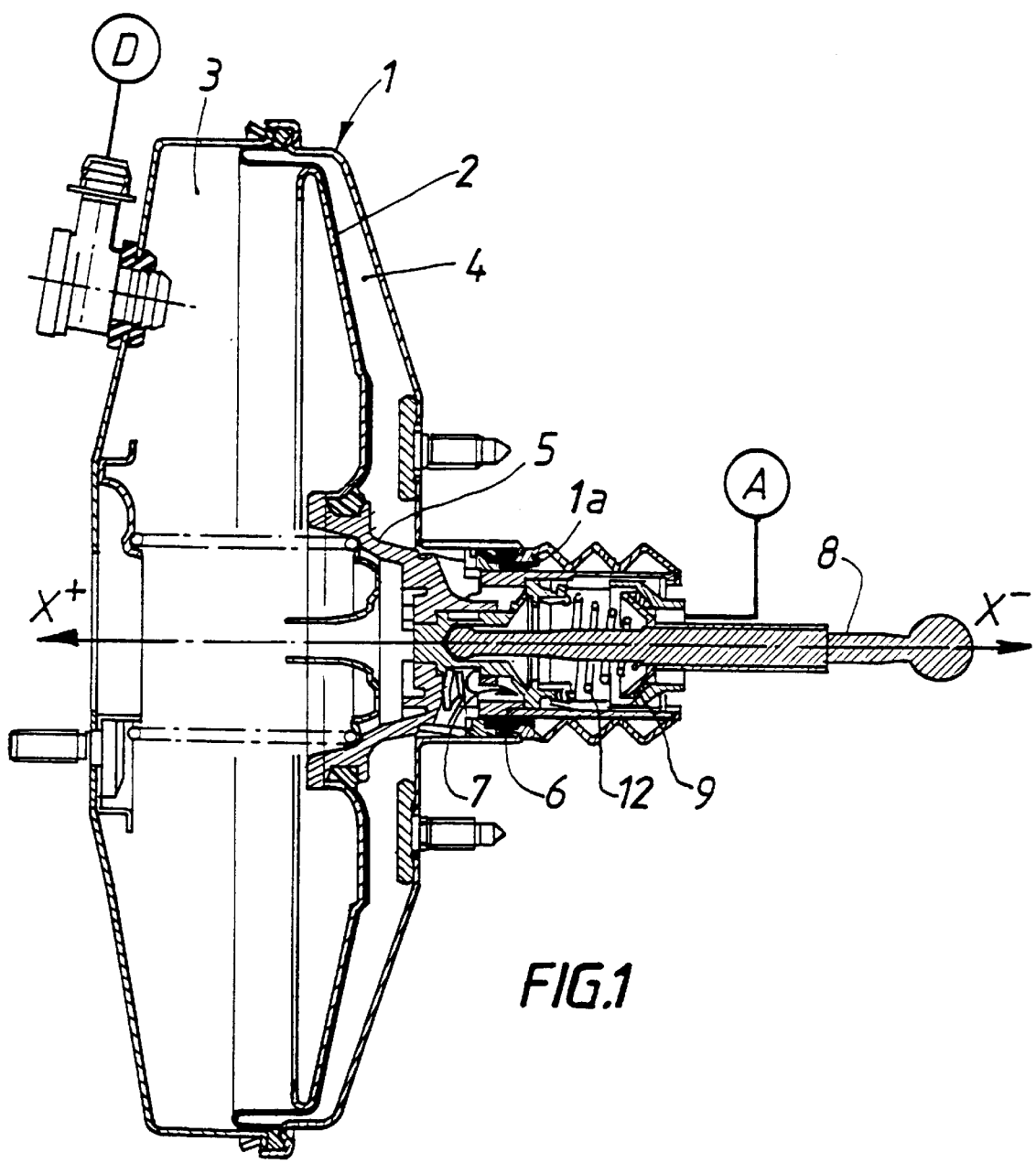
FIG. 1 is a diagrammatic sectional view through a pneumatic brake booster in accordance with the invention.

In so far as the invention relates merely to an improvement made to pneumatic boosters, and as the general construction and operation of the latter are well known to those skilled in the art, the principle of these devices will merely be recalled briefly here in order to allow a complete understanding of the improvement that the invention represents.

Broadly speaking, a pneumatic brake booster essentially comprises a rigid casing 1, a moving partition 2; a pneumatic piston 5; a three-way valve 7; an operating rod 8; and a purification filter 9.

The moving partition 2 delimits in leaktight fashion, within the casing 1, a front chamber 3 and a rear chamber 4, the front chamber 3 in operation being connected to a first pressure source D which delivers a pressure Pd which is relatively low, and the rear chamber 4 being selectively connected either to the first pressure source D, or to a second pressure source A, for example the atmosphere, which delivers a pressure Pa which is relatively high, that is to say higher than the first pressure Pd.

The pneumatic piston 5 moves with the moving partition 2 and ends at the rear in a hub 6 which is mounted to slide in an opening 1a in the casing 1.

The three-way valve 7 which is housed in the hub 6 is capable selectively of adopting a state of rest in which the rear chamber 4 is connected to the first pressure source D, and an actuating state in which the rear chamber 4 is connected to the second pressure source A.

Figure 2:
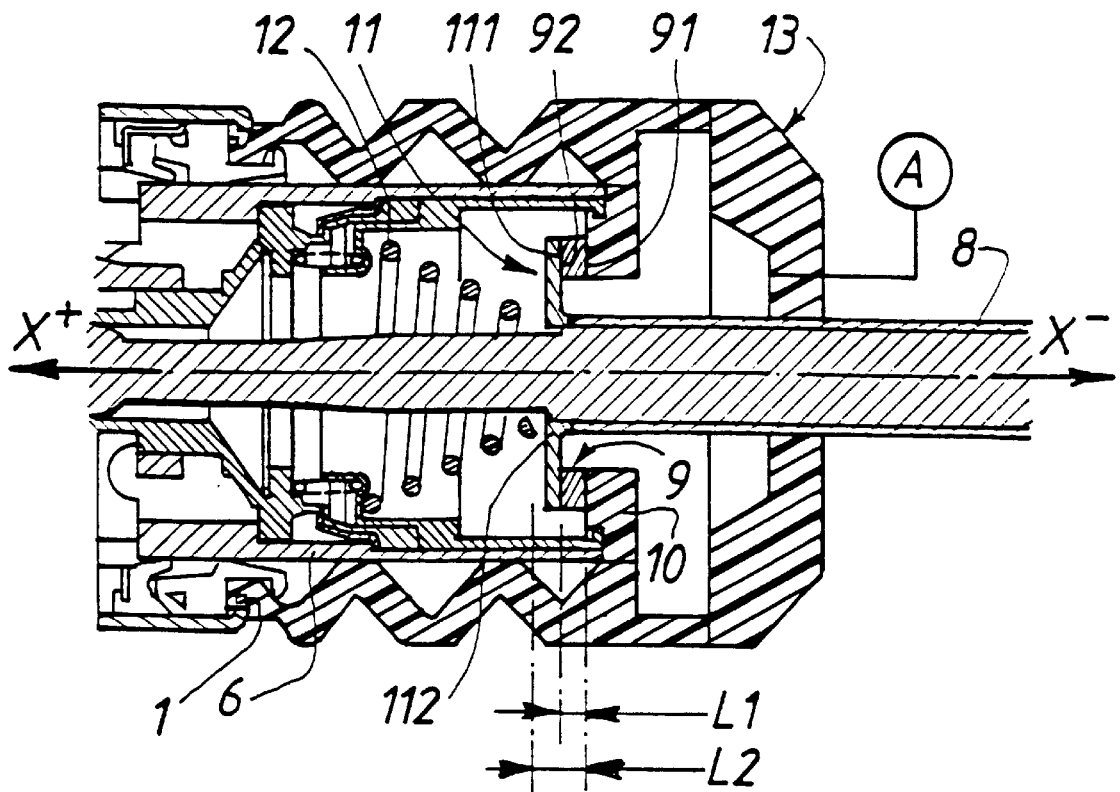
FIG. 2 is a sectional view through part of a booster in accordance with one possible embodiment of the invention.
Figure 3:
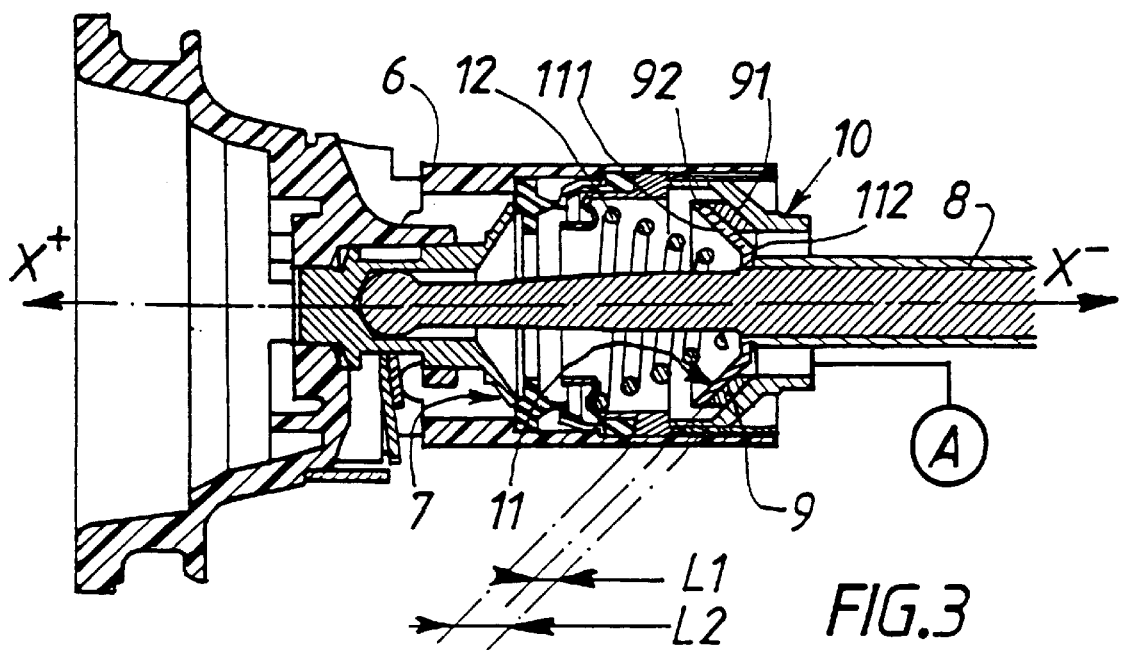
FIG. 3 is a sectional view through part of the booster depicted in FIG. 1.
Figure 4:
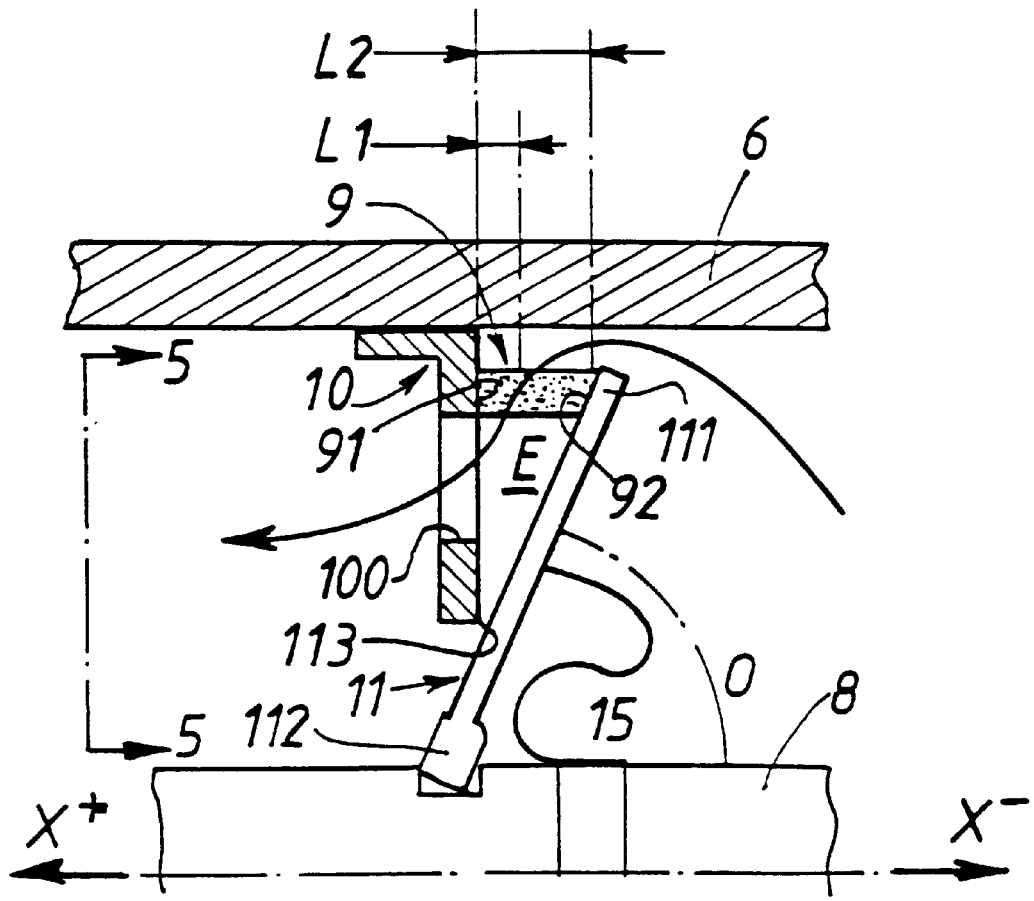
FIG. 4 is a sectional view of part of a booster in accordance with another possible embodiment of the invention.

The operating rod 8 is mounted to slide in the hub 6 in such a way that it can be displaced with respect to this hub, in a first axial direction X+, from a first extreme position depicted in FIGS. 1 to 3, for which the valve 7 is in its state of rest, as far as a second extreme position illustrated in FIG. 4, which is shifted with respect to the first extreme position in the direction X+, and for which the valve 7 is in its actuating state.

A spring 12 is provided, for permanently urging the operating rod 8 in a second axial direction X− the opposite of the first X+, that is to say for pushing it back towards its first extreme position.

The filter 9, of annular shape, is inserted between the second pressure source A and the rear chamber 4, and housed in the hub 6 around the operating rod 8.

According to the invention, the filter 9 is made of a compressible material and has a first face 91 held stationary with respect to the hub 6 and a second face 92 kinematically linked to the operating rod 8 so that it can be displaced with respect to the hub 6, the filter 9 thus having a volume which varies with the displacement of its second face 92.

More specifically, the filter 9 has a minimum volume V1, for which it is compressed, when the operating rod 8 is in its first extreme position, and a maximum volume V2, for which it is relaxed, when the operating rod 8 is in its second extreme position.

For example, as FIGS. 2 to 4 show, the booster of the invention may comprise an annular support 10 secured to the hub 6, to which the first face of the filter 9 is attached, the second face of the filter 9 for its part being attached to an outer edge 111 of a flange 11, an inner edge 112 of which is secured to the operating rod 8.

In the embodiment illustrated in FIG. 2, the annular support 10 may consist of a rigid annular part of a bellows 13 secured to the hub 6 and acting as a somewhat non-selective primary filter.

However, this support 10 may also, as shown by FIG. 3, be made of a component screwed to the inside of the hub 6, or alternatively, as FIG. 4 shows, of a ring bonded or crimped to the hub.

The flange may itself be made of metal (FIG. 3) or made of a rigid polymer (FIG. 2) and may also be flat (FIG. 2), conical and rigid (FIG. 3), or alternatively flexible, as shown by FIG. 4 which will be described in detail later.

In the embodiments of FIGS. 2 and 3, the flange 11 follows on from the annular support 10 in the first axial direction X+, whereas FIG. 4 illustrates an opposite arrangement, in which the flange 11 precedes the annular support 10 in the first axial direction X+.

Nonetheless, in the embodiments illustrated in FIGS. 2 to 5, the variations in volume of the filter 9 are all obtained by variations in the length of the filter in the first axial direction X+, this filter having, between its two faces 91, 92, a first length L1 when compressed to its minimum volume V1, and a second length L2 when relaxed and occupying its maximum V2.

Figure 5:
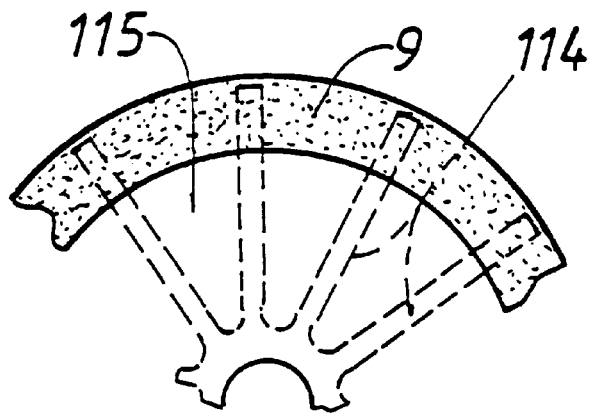
FIG. 5 is a partial front-on view taken in the direction marked by the arrows 5—5 in FIG. 4, through the annular support which is assumed to be transparent.

In the embodiment of FIGS. 4 and 5, the flange 11 is shaped like a cone with a variable vertex angle O, urged elastically in the first axial direction X+ for which this angle increases, like an automatic umbrella.

For example, this flange is formed of a star-shaped skeleton 114 made of a flexible polymer, covered with air-tight film 115, and urged by a spring 15.

The annular support 10 and the flange 11 rest on each other at a number of contact points 113 on the flange, which are some way between the inner edge 112 and outer edge 111 thereof, the annular support 10 and the collar 11 delimiting between them a space E which is not air-tight, and opens to air passages 100 formed in the annular support 10.

Thus, a movement of the operating rod 8 in the first axial direction X+ displaces the outer edge 111 of the flange 11 in the opposite direction X−, for which the cone angle O decreases.

All that is then required is for the contact point 113 of the flange 11 to be closer to the inner edge 112 than to the outer edge 111 of this flange 11, to ensure that a movement of a first amplitude of the operating rod 8 with respect to the hub 6 will cause an elongation of the filter 9 of a second amplitude that is greater than the first amplitude.

Figure 6:
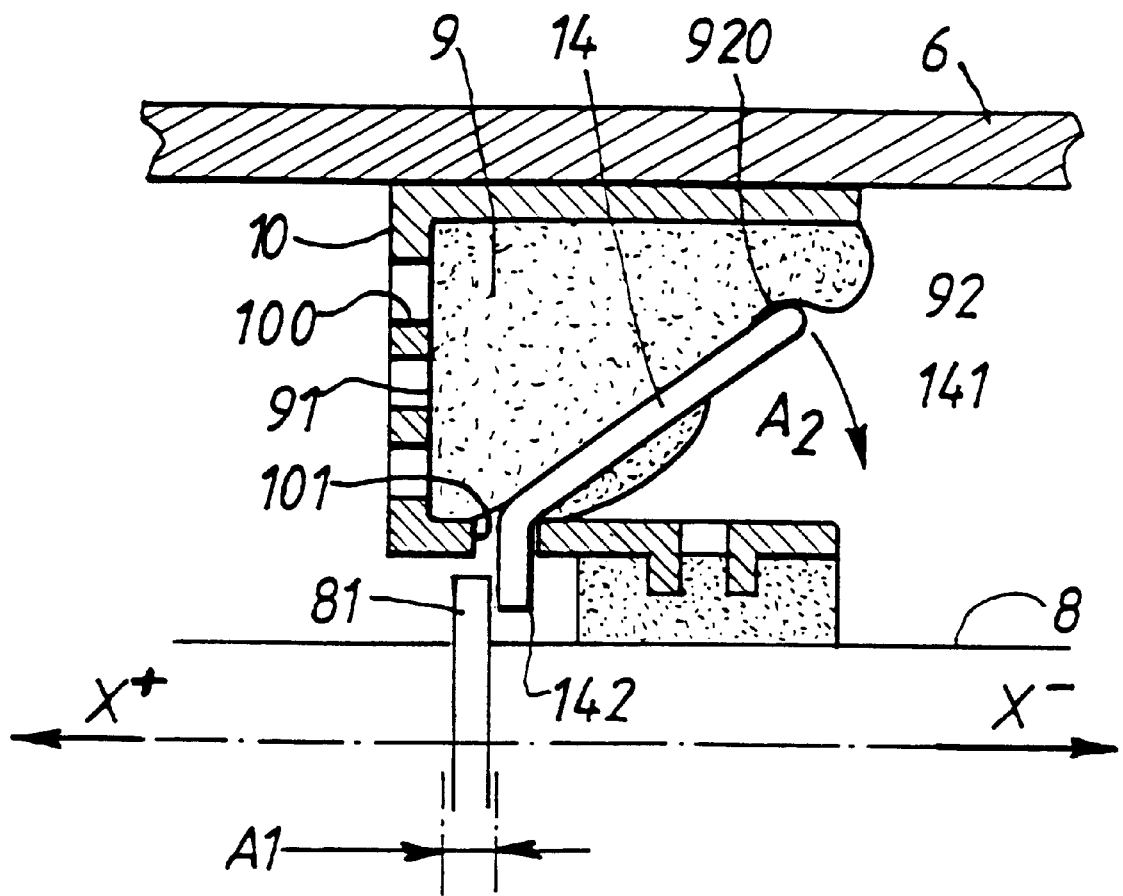
FIG. 6 is a sectional view through part of a booster in accordance with another possible embodiment of the invention.
Figure 7:
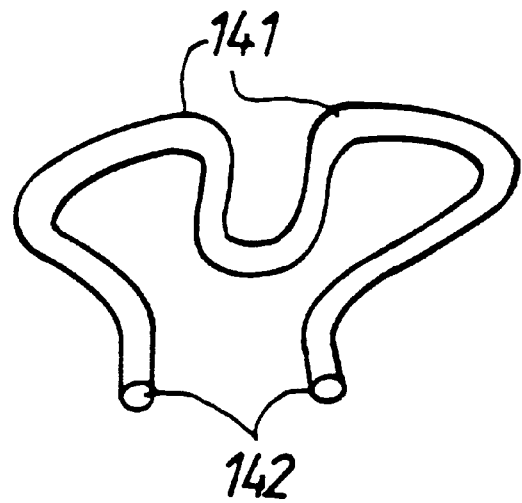
FIG. 7 is a perspective view of the tilting member used in the embodiment of FIG. 6.

FIGS. 6 and 7 illustrate another embodiment of the invention, which also allows a displacement greater than that performed by the operating rod 8 with respect to the hub 6 to be transmitted to the second face 92 of the filter 9.

For that, at least part 920 of the second face 92 of the filter 9 is, as in the previous case, kinematically linked to an active region 141 of a tilting member 14 resting both on the hub 6 and on the operating rod 8.

In other words, certain points of the tilting member are stationary with respect to the hub, while other points of the tilting member are stationary with respect to the operating rod.

The tilting member 14 in this instance adopts the shape of a metal staple, of which the upper part 141 (for the arrangement illustrated in FIGS. 6 and 7) comes into contact with the second face 92 of the filter 9, and of which the lower part 142 is inserted in an orifice 101 in the annular support 10, which is pierced with axial air passages 100.

Beyond the orifice 101, the lower part 142 of the tilting member 14 receives, from an annular relief 81 secured to the operating rod 8, the elastic force exerted by the spring 12 on the operating rod in the opposite axial direction X−.

In this way, the tilting member 14 pushes the second face 92 of the filter 9 back in a direction which is both axial and radial, so that a displacement of first amplitude A1 of the operating rod 8 with respect to the hub 6 produces, with respect to this hub, a displacement of second amplitude A2, higher than the first A1, of the upper part 141 which constitutes the active region of the tilting member.

In the embodiment of FIGS. 6 and 7, the filter very advantageously is made of a porous polymer with elastic properties, so that the second face 92 of the filter 9 rests permanently against the active region 141 without it being necessary to bond this face 92 to the tilting member 14.

In the other embodiments shown, it is, however, possible to envisage for the filter to be made of a porous polymer which may or may not be elastic, the faces 91, 92 of which are attached by bonding.

What is claimed is:

1. A pneumatic brake booster comprising: a rigid casing; a moving partition delimiting, in leaktight fashion, a front chamber and a rear chamber inside said casing, said front chamber in operation being connected to a first pressure source delivering a first pressure; a pneumatic piston moving with said moving partition and ending in a hub mounted to slide in an opening in said casing; a three-way valve housed in said hub and capable selectively of adopting a state of rest and an actuating state, said the rear chamber in said state of rest being connected to said first pressure source and in said actuation state to a second pressure source which delivers a second pressure higher than said first pressure; an operating rod mounted to slide in said hub in a first axial direction between first and second extreme positions in which said valve is respectively in said state of rest and said actuating state, said operating rod being subjected to an elastic force acting in a second axial direction the opposite of said first axial direction; and an annular purification filter located between said second pressure source and said rear chamber and housed in said hub around said operating rod, characterized in that said filler is made of a compressible material having a first face attached to an annular support secured to said hub to retain said first face in a stationary position with respect to said hub and a second face which is kinematically connected to said operating rod and displaced with respect to said hub, said filter having a volume that varies with the displacement of said second face of with respect to said hub, said filter having a minimum volume upon being compressed as said operating rod moves to said first extreme position and a maximum volume upon being relaxed as said operating rod moves to said second extreme position.

2. The pneumatic booster according to claim 1, wherein said second face of the filter is characterized by having an outer edge attached of a flange and an inner edge secured to said operating rod.

3. The pneumatic booster according to claim 2, wherein said flange is characterized by extending from said annular support in the first axial direction and said second face of the said filter extends from said first face in said first axial direction.

4. The pneumatic booster according to claim 1 wherein said second face of said filter is characterized by being attached to an outer edge of a flange with an inner edge of said flange being secured to said operating rod.

5. The pneumatic booster according to claim 1 wherein said filter is characterized by being made of a porous polymer.

6. A pneumatic brake booster comprising: a rigid casing; a moving partition delimiting, in leaktight fashion, a front chamber and a rear chamber inside said casing, said front chamber in operation being connected to a first pressure source delivering a first pressure; a pneumatic piston moving with said moving partition and ending in a hub mounted to slide in an opening in said casing; a three-way valve housed in said hub and capable selectively of adopting a state of rest and an actuating state, said the rear chamber in said state of rest being connected to said first pressure source and in said actuation state to a second pressure source which delivers a second pressure higher than said first pressure; an operating rod mounted to slide in said hub in a first axial direction between first and second extreme positions in which said valve is respectively in said state of rest and said actuating state, said operating rod being subjected to an elastic force acting in a second axial direction the opposite of said first axial direction; and an annular purification filter located between said second pressure source and said rear chamber and housed in said hub around said operating rod, characterized in that said filter is made of a compressible material having a first face is retained in a stationary position with respect to said hub and a second face which is kinematically connected to said operating rod and displaced with respect to said hub, second face having an outer edge attached of a flange and an inner edge secured to said operating rod, said filter having a volume that varies with the displacement of said second face of with respect to said hub, said filter having a minimum volume upon being compressed as said operating rod moves to said first extreme position and a maximum volume upon being relaxed as said operating rod moves to said second extreme position.

7. The pneumatic brake booster according to claim 6, wherein said flange is characterized by extending in said first axial direction from an annular support secured to said hub and second face of said filter is characterized by extending from said first face in said first axial direction.

8. The pneumatic brake booster according to claim 6, wherein said filter is characterized by being made of a porous polymer.

9. A pneumatic brake booster comprising: a rigid casing; a moving partition delimiting, in leaktight fashion, a front chamber and a rear chamber inside said casing, said front chamber in operation being connected to a first pressure source delivering a first pressure; a pneumatic piston moving with said moving partition and ending in a hub mounted to slide in an opening in said casing; a three-way valve housed in said hub and capable selectively of adopting a state of rest and an actuating state, said the rear chamber in said state of rest being connected to said first pressure source and in said actuation state to a second pressure source which delivers a second pressure higher than said first pressure; an operating rod mounted to move in said hub in a first axial direction between first and second extreme positions in which said valve is respectively in said state of rest and said actuating state, said operating rod being subjected to an elastic force acting in a second axial direction the opposite of said first axial direction; and an annular purification filter located between said second pressure source and said rear chamber and housed in said hub around said operating rod, characterized in that said filter is made of a compressible material having a first face is retained in a stationary position with respect to said hub and a second face which is kinematically linked with an active region of a tilting member which rests both on said hub and said operating rod, said operating rod on being displaced in said hub having a first amplitude which produces a displacement of a second amplitude, greater than the first, in said active region with respect to the hub, said filter having a volume that varies as a function of said second amplitude; said filter having a minimum volume upon being compressed as said operating rod moves to said first extreme position and a maximum volume upon being relaxed as said operating rod moves to said second extreme position.

10. The pneumatic brake booster according to claim 9, wherein said filter is characterized by being made of a porous polymer.

* * * * *